April 15, 1924.  
E. L. GROSS  
1,490,820  
INTERNAL COMBUSTION ENGINE  
Filed Jan. 19, 1920  
6 Sheets-Sheet 1

Witnesses:

Inventor:  
Edward L. Gross  
Hill & Hill  
By  Atty's.

April 15, 1924.

E. L. GROSS 1,490,820

INTERNAL COMBUSTION ENGINE

Filed Jan. 19, 1920    6 Sheets-Sheet 2

Patented Apr. 15, 1924.

1,490,820

UNITED STATES PATENT OFFICE.

EDWARD L. GROSS, OF CHICAGO, ILLINOIS.

INTERNAL-COMBUSTION ENGINE.

Application filed January 19, 1920. Serial No. 352,340.

*To all whom it may concern:*

Be it known that I, EDWARD L. GROSS, a citizen of the United States, residing at Chicago, in the county of Cook and State of Illinois, have invented certain new and useful Improvements in Internal-Combustion Engines, of which the following is a description.

My invention belongs to that general class of devices known as internal combustion engines, and relates particularly to what may be termed an oscillating type of engine. The invention has among its objects the production of a device of the kind described which is simple, compact, durable, efficient and satisfactory for use wherever found applicable. It has particularly among its further objects the production of an engine which is a marked improvement over the present type of reciprocating engines, which will develop horse-power that will compare favorably with the reciprocating type, but in which the engine will be of less weight, less number of parts, more economical in construction, and substantially free from vibration. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Figure 1 is a sectional diagrammatic view illustrating the basic principle upon which the device operates;

Before describing the construction of the engine in detail, it might be explained that in the type of engine illustrated there is provided a drum 1 divided with partitions 2 into two chambers, and an oscillating piston member 14 provided with extending parts 15 and 15' which divide each chamber into compartments, which may be termed combustion chambers (see Figure 1) A, B, C, and D. By admitting the combustible charges into these combustion chambers or compartments and igniting the same, causing a succession of explosions of the charges, the piston member 14 is caused to oscillate back and forth, that is to say, rock back and forth in the drum, the piston being operatively connected with the drive shaft in such a manner that the oscillations are converted into a continuous rotary movement of the drive shaft, so that power is transmitted to drive the shaft in the desired direction.

Figure 1:
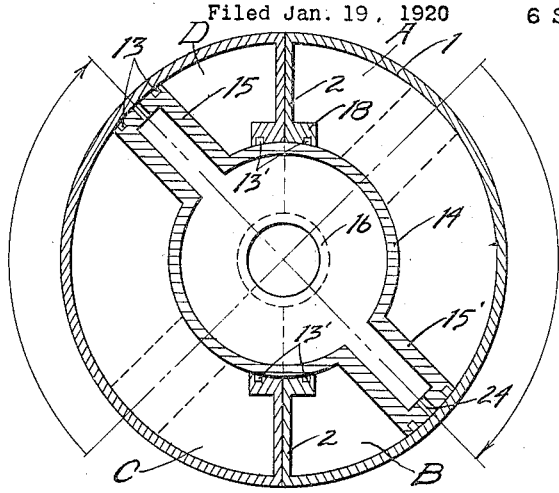
Figure 7:
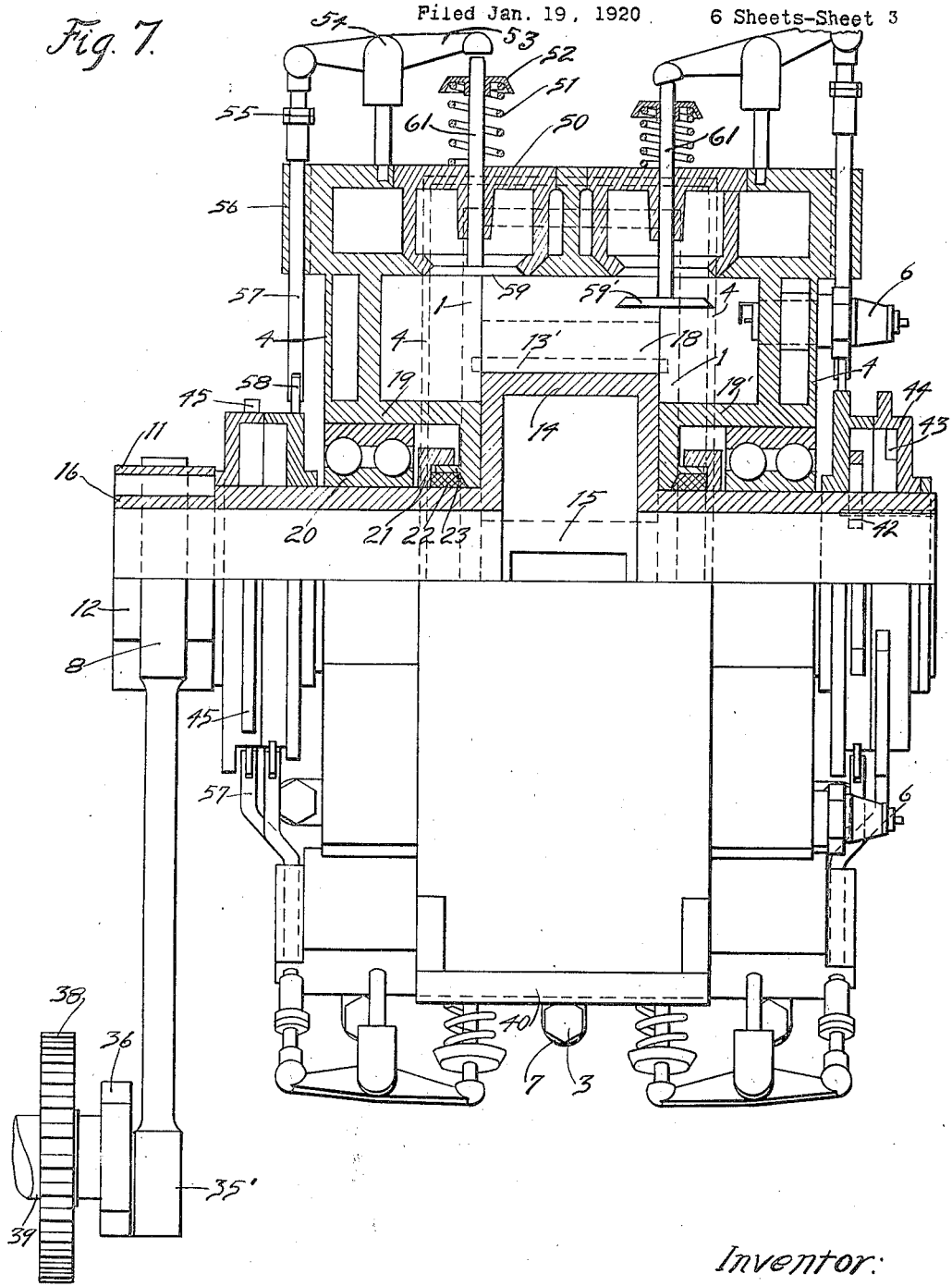
Figure 7 is a combined sectional view taken on the line 7—7 of Fig. 6 and side elevation of the same.

Referring to the drawings, particularly first to Figure 1, my improved device consists primarily of what may be termed a hollow cylindrical shaped casing or drum 1, which in the construction shown is preferably made in two parts and divided into two chambers by means of a wall or partition 2. As shown, each part 1 is provided with a portion of the partition, the drum parts being secured together in any suitable manner, as will be hereafter described. The drum is formed with front and back sides or covers having central circular openings. Arranged in the casing or drum is an oscillating member, or it may be termed a piston, which consists of a cylindrical portion 14 having the side or end walls or extensions 16 and extending parts 15 and 15', which are of a length to extend to and substantially contact with the inner circumference of the drum. The walls 16 are extended axially, as shown, and extend through the holes in the front and back sides of the drum or casing. As shown in Figure 7, anti-friction bearings, as shown ball-bearings, 20 may be arranged between the extending parts 16 and the walls of the openings through the sides of the drum or casing. The extending parts 15 of the oscillating member are arranged so as to contact with the inner circumference of the drum as mentioned and with the inner faces of the front and back sides. As shown, the partitions are preferably formed as at 18 so as to increase the bearing contact between the ends of the partitions and the outer face of the member 14. In order to prevent leakage of the gases past the extending parts 15, the same are provided with grooves into which fit interlocking metallic strips 13, which perform the same functions as piston rings in the pistons of a reciprocating engine. These strips may be held in place in any suitable manner. As shown, they are held against the outer and side walls of the drum by means of springs 35, which fit into holes or recesses in the walls of the parts 15—15. Leakage of gases between the cylindrical surface of the piston part 14 and the drum partitions is prevented by the strips 13'. To prevent leakage of the gases between the piston and drum covers, packing glands 23 may be provided whereby metallic packing 22 is compressed by means of packing nut 21, thus effectively sealing the opening between the drum covers and piston, making the engine gas tight. To prevent overheating of the walls due to the explosion of gases, the drum may be provided with a water jacket 4 through which cooling water may be circulated, the incoming water entering the jacket, for example through the lower opening 5', and leaving it at the upper opening 5.

In the construction shown, the drum 1, as before mentioned, is in two parts, the same being divided along its vertical diameter, so that the ends of each half are sealed by means of the wall or partition 2—2. The parts of the drum are held together by means of the bolts 3 passing through the lugs 7. By dividing the drum into sections, the same may be more easily machined and assembled, and the same affords a ready access for inspection or cleaning of the interior. Obviously the drum may be divided into any number of sections or parts desired, this being a matter of preference.

As shown in Figures 7, 9, 10, 11 and 12, a ring 11 or the equivalent is arranged on the extension 16, the same provided with forked arms 12—12, so that the arms oscillate through an arc of ninety degrees when the piston is oscillated. The arms are connected by means of connecting rods 8—8' and links 36—36', which are substantially cranks connected by pins 35' with the gears 38—38'. Gears 38 and 38' mesh with a main gear 41 mounted on a shaft 39, which may be termed the main drive shaft.

Figure 6:
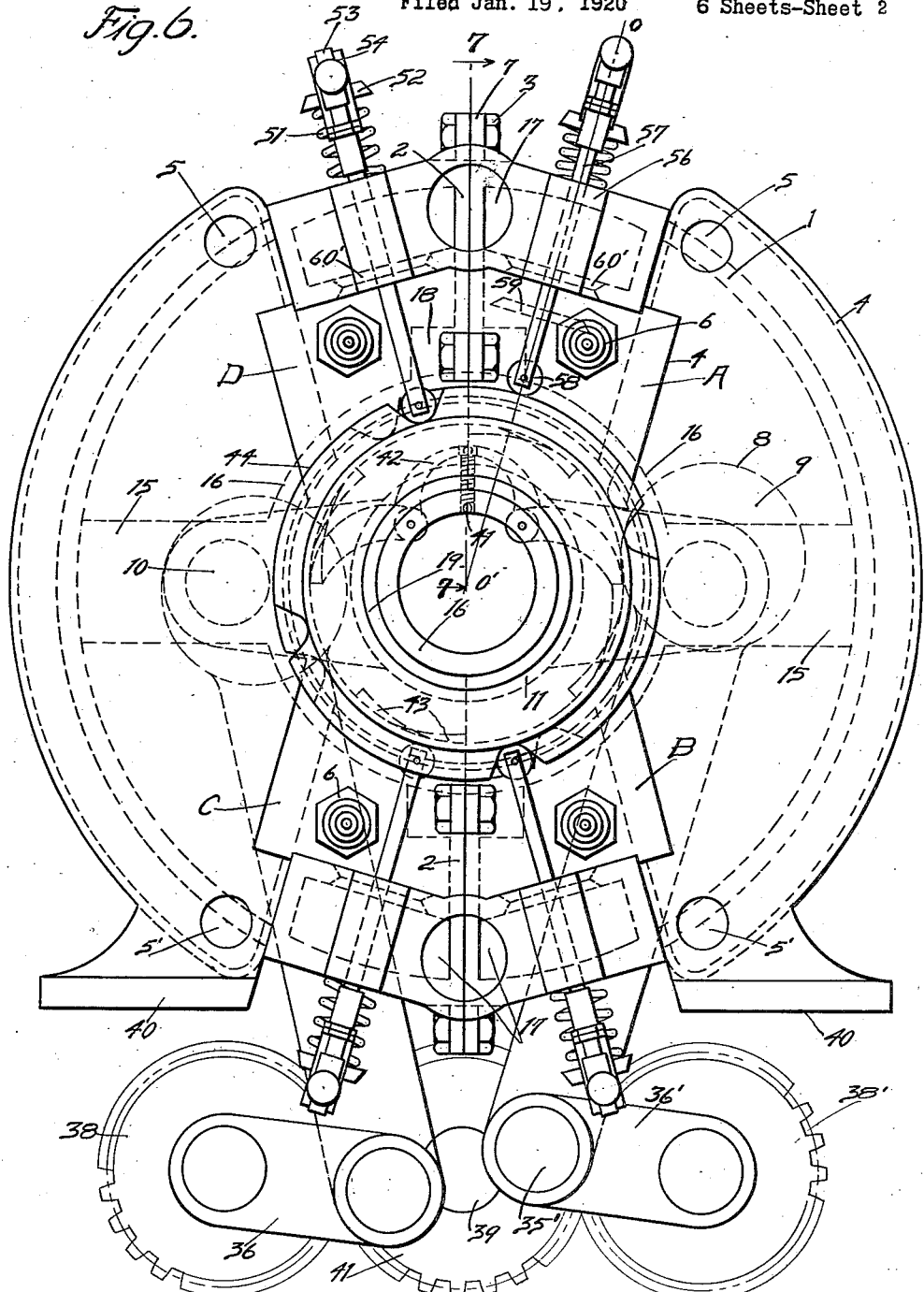
Figure 6 is a front view of a complete engine of the type employing the poppet-valves controlled by the cam members illustrated in Figures 4 and 5.

Referring to Figures 6 and 7, the drum 1 is provided with suitable inlet ports 60' opening into compartments A, B, C and D (see Fig. 6), and with suitable exhaust ports 60 opening into the same compartments. The ports are controlled by valves 59 and 59'. As shown, the valves are mounted on stems 61 and normally held against their seats by springs 51, and they are operated in substantially the same manner as the standard overhead poppet-valves employed in various types of automobile engines through rocker arms 53. The rocker arms 53 are supported in forks 54 and arranged to be operated by tappet rods 57. The tappet rods may be provided with adjusting nuts 55, and are arranged to be actuated through cam rollers 58 arranged to cooperate with suitable cams. As shown (see Figs. 4, 5, 6 and 7), I provide double throw cams 44 and 45, which are free to rotate on front and rear cylindrical extensions of the piston. Each pair of inlet and each pair of exhaust valves being operated by one cam, the cams are operated by the oscillating movement of the piston extensions on which they are mounted, the cams controlling the inlet valves of compartments B and D and their exhaust valves are moved through an angle of ninety degrees each time the piston swings from left to right, or (see Figures 1 and 6) in a clockwise direction and remain stationary during each piston swing in an anti-clockwise direction, during which stroke, however, the two cams operating inlet and exhaust valves of compartments A and C, are revolved through an angle of ninety degrees and vice versa. As shown, pawls 42 are mounted in slots cut in the cylindrical extensions 16 of the piston and by means of springs 41, their operating ends are held in contact with the inner circumference of the cams. The cams are each provided with inwardly projecting ratchet teeth 43 spaced ninety degrees apart, the pawls being adapted to engage with the teeth of their respective cams so that they are operated as above described.

When the tappet rollers ride on portion 45 of their respective cams, the valves remain closed, but whenever cam elevations 44 pass under their respective tappets, the tappets are raised and the inlet valves are held off their seats during the respective suction stroke and the exhaust valves are similarly held during each exhaust stroke. Each cam being revolved ninety degrees once each second stroke or swing of the piston, and since the cam elevations for each valve are one hundred and eighty degrees apart, the tappets, and consequently the valves, will be operated after each fourth stroke of the piston, which is the proper timing for a four cylinder motor. As shown in Figures 6 and 7, the piston is in a horizontal position, having moved through an angle of forty-five degrees in a clockwise direction, so that cylinder or compartment A is at the center of its suction stroke, cylinder or compartment B of its compression stroke, cylinder C of its explosion stroke, and cylinder or compartment D of its exhaust stroke. As will be seen, the inlet valve in compartment A and exhaust valve in compartment D are open and their tappet rollers are riding on cam projections 44. The inlet valves in cylinders or compartments B and C are closed and their tappet rollers are riding on the idler surface 45 of cam.

A carbureter of suitable design may be connected (see Fig. 6) through suitable piping or manifolds with the intake ports 17, which communicate with the valve chambers and the intake ports to the interior of the drum. The exhaust ports are similarly formed at the opposite side of the drum. As shown in Figure 7, a spark plug 6 or the equivalent ignition mechanism, is employed for each combustion chamber or compartment.

Figures 2, 3:
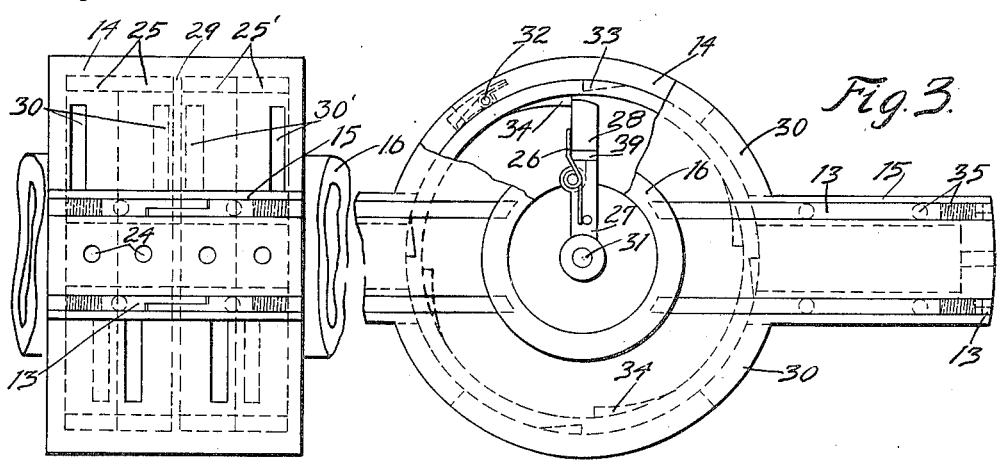
Figure 2 is an end elevation of one of the types of oscillating piston.
Figure 3 is a side elevation of the same with a portion broken away to illustrate the valve mechanism.
Figures 4, 5:
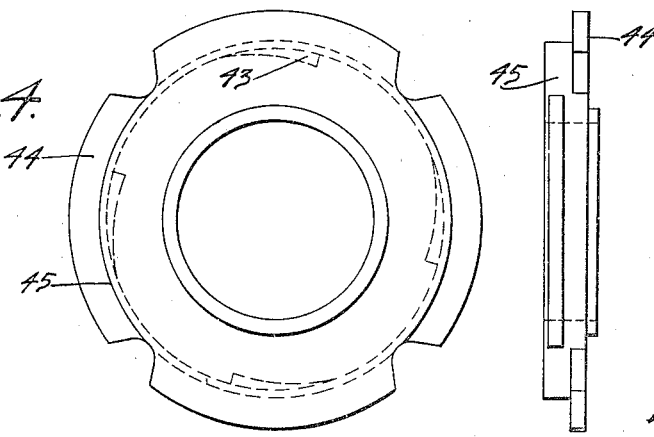
Figure 4 is a front elevation of a valve operating cam for one form of my invention.
Figure 5 is a side elevation of the same.
Figure 8:
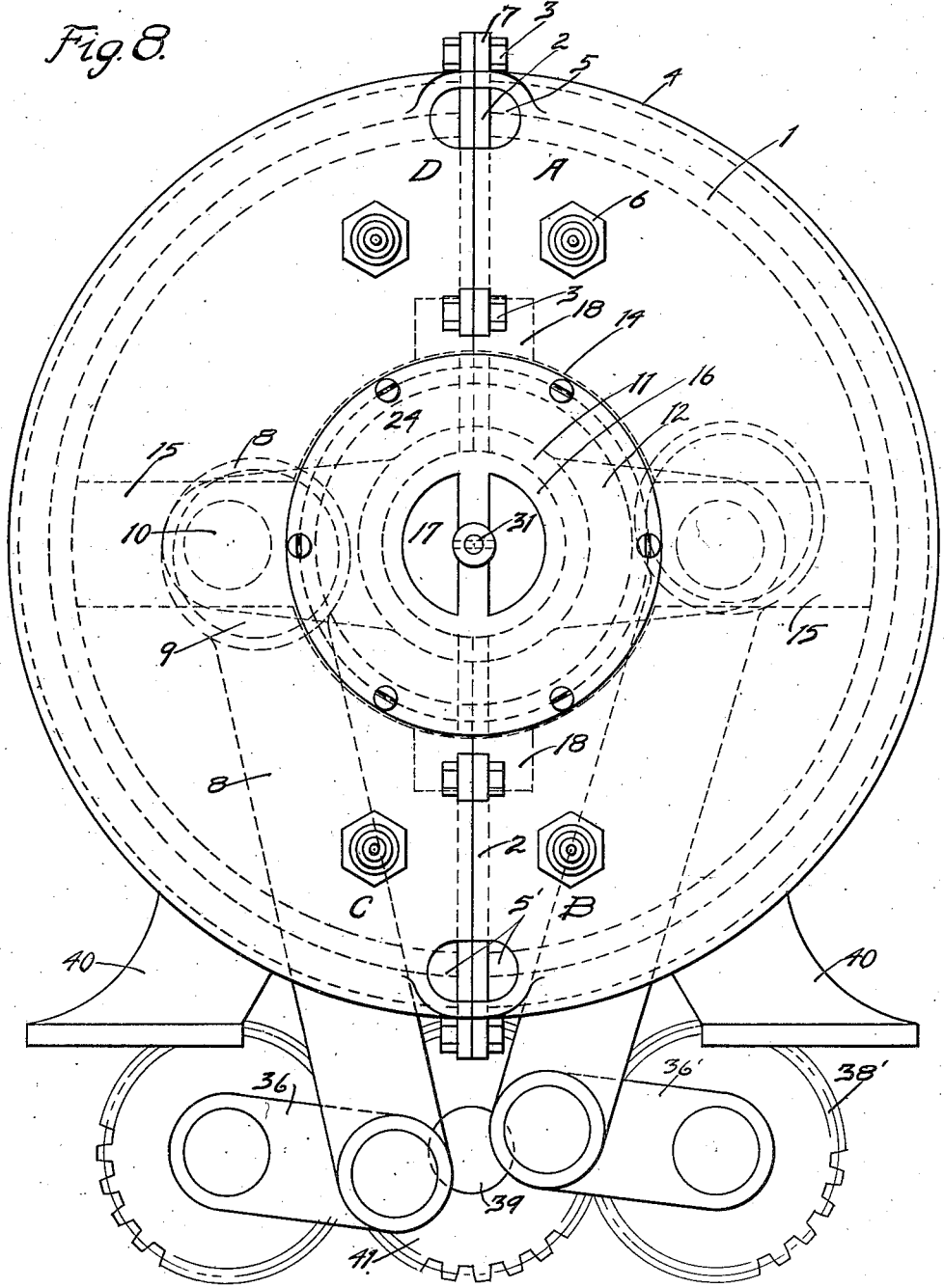
Figure 8 is a view similar to Figure 6 of the type equipped with the internal rotary slide valves.
Figure 9:
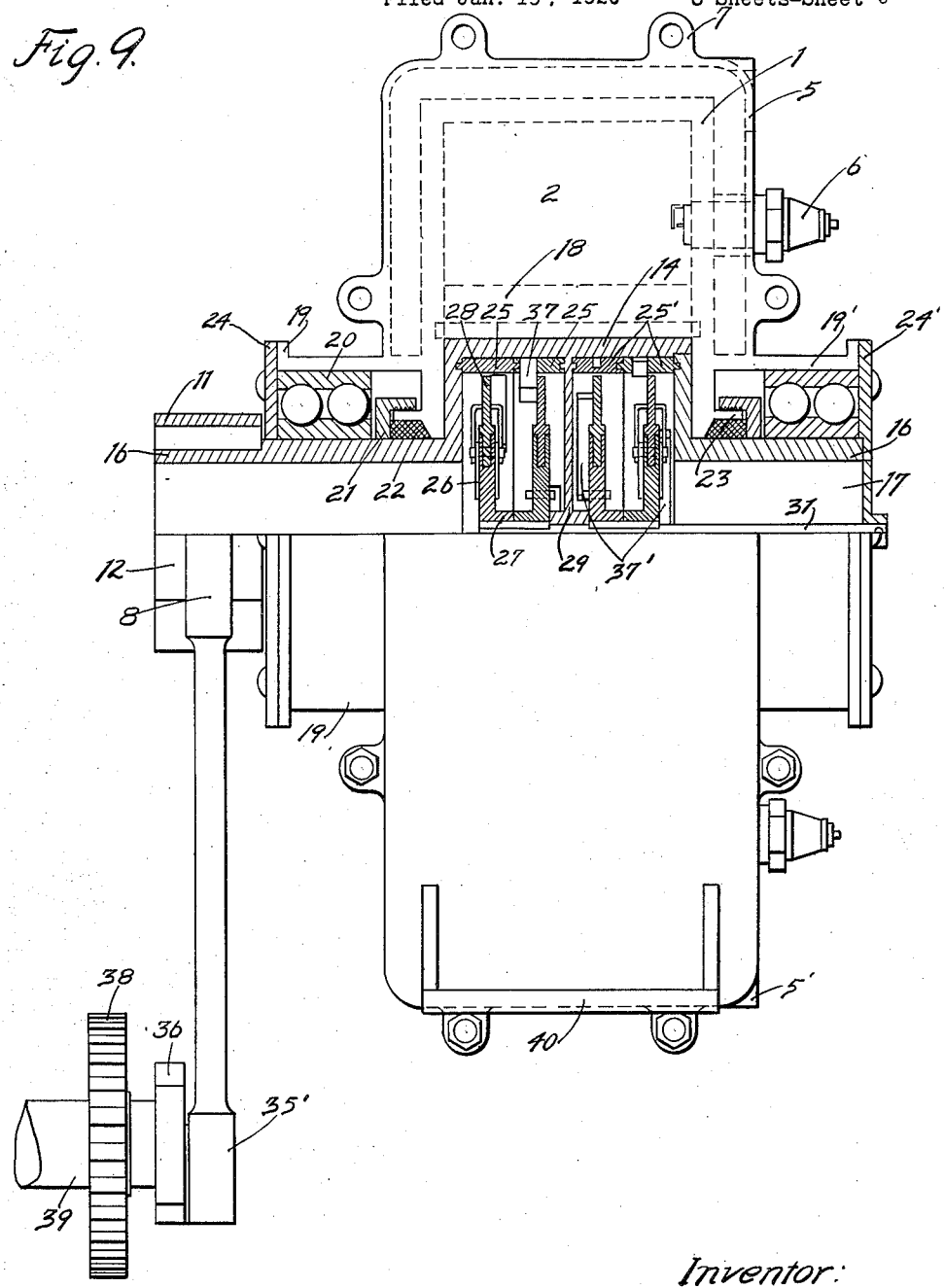
Figure 9 is a combined sectional view and side elevation of the same.

Before describing the operation, I will describe the engine with the sliding or rotating valves or rings in lieu of the poppet valves. Referring to Figure 8, the engine is shown provided with internal rotating slide valves or rings, Figure 9 showing a sectional view along the vertical diameter of the drum, or at a line of division of the right and left drum partitions with a side view of the lower half. The hollow cylindrical central portion of the piston part 14 is divided into a front and back chamber by means of the wall 29, as clearly shown in Figures 2 and 9, and provided with inlet ports 30', which open into the front chamber of the piston and provided with exhaust ports or slots 30, which open into the back chamber, the ports or slots being staggered, as shown. Arranged inside of the piston are the rotating valves 25—25', of which the former control the exhaust ports and the latter the inlet ports. Each valve is provided with two pairs of slots or ports 37—37' each pair being one hundred and eighty degrees or one-half a revolution apart. These valves are preferably slidably arranged on the inner peripheral wall of the piston so as to cover or uncover the ports in the piston and are operated in a manner to be hereinafter described. The movement of the valves causes the slots in the same to intermittently coincide at the proper instant with their respective ports in the piston, thus permitting charges of air and gas vapor to be drawn through the inlet port into the combustion chamber, or compartment, during the suction stroke of the piston, the same at other times effectively closing or sealing the same. In a like manner, the slide rings controlling the exhaust ports cause the slots or ports 37 in the piston to coincide with the exhaust ports 30 at the proper instant, permitting the burned gases to be expelled during the exhaust stroke of the piston. The rotating valves or rings are operated by the swinging or oscillation of the piston, which is provided with pawls 32 (see Fig. 3) fitting into a slot and so constructed that they are held against the outer circumference of the valves by means of springs or the equivalent. The valves are provided at ninety degree intervals with countersunk depressions or teeth 33 into which the pawls engage at each ninety degree swing of the piston. Each time the piston swings through an arc of ninety degrees from left to right, the pawls 32 engageable with the recesses 33 and cause a rotating inlet valve to rotate in the same direction through an angle of ninety degrees, and each time the piston swings in the opposite direction, the pawls 32 disengage and slide over the outer circumference of the valves, which are held stationary by means of the internal locking pawls 27—28, which are mounted upon and keyed to a stationary shaft 31, the inner circumference of the rotating valves being provided with ratchet teeth 34, for engagement with pawls 28, the teeth of the inlet valve 25' facing in the opposite direction to those of the exhaust valves 25. The upper half of the locking pawls are pivoted on forked member 27 and held in a vertical position by means of spring 26 and stop 39. The upper half of the pawls are thus free to swing in one direction only, those pawls controlling the inlet valves 25' being free to swing in the opposite direction from the exhaust valve locking pawls. As shown in Figures 2 and 3, the inlet rotating valve 25' is held in locked position by means of pawl 27—28, engaging with ratchet tooth 34 while the piston is swinging in a clockwise direction, and as shown, is in the middle of the suction stroke of compartment A. The external propelling pawl 32 is forty-five degrees from its recessed ratchet tooth 34, with which it will engage at the completion of the stroke, and carry the valve with it through a ninety degree swing in an anti-clockwise direction. Each valve, therefore, is rotated ninety degrees on every alternate swing or stroke of the piston, and is stationary on each intervening stroke. Calling each ninety degree swing of the piston a stroke, and numbering them 1, 2, 3 and 4, the inlet valves are locked on strokes 1 and 3 and rotate on strokes 2 and 4. Similarly, exhaust valves are locked on strokes 2 and 4 and rotate on strokes 1 and 3. Thus at each fourth stroke of the piston a valve of either an inlet or exhaust port is moved in proper position so that during the next stroke, the proper port opening in the piston passes over its corresponding slot or port in the valve, thus permitting the taking of the charge on the inlet side or a discharge of burned gases on the exhaust side.

As shown in Figure 1 and before mentioned, the piston is designed to swing or oscillate on a horizontal axis through an angle of ninety degrees, its limiting positions being shown by full and by broken lines. When the piston is in the position shown by the full lines, compartments D and B are formed between the piston extensions 15—15' and the drum partition 2, and when the piston is moved to its other limiting position, as indicated by the broken lines, spaces of compartments A and C are formed. Spaces A, B, C and D correspond to the clearance or compression spaces above the pistons of a reciprocating type of engine. It will thus be seen that the spaces being provided with proper inlet and exhaust ports which are opened or closed by suitable valves at the proper time and sequence, can be intermittently increased or decreased in volume by the rocking or oscillating motion of the piston, so that each space functions similar to the separate cylinder of a reciprocating engine successively going through the cycle of suction, compression, explosion and exhaust.

When, as shown by the arrow in Figure 1, the piston swings from the position indicated in broken lines to the position shown in the full lines, a vacuum is produced in compartment A, so that if its inlet port connected to a carburetor, is opened, the charge of explosive mixture will be drawn in. Slightly before the completion of the piston's swing or stroke, however, the inlet port must be closed so that on the return swing of the piston the mixture is compressed into the space A. If, when the piston reaches its original or starting position, an electric spark is caused to pass in the compartment, an explosion will follow, which action against the piston extension 15 will force the piston to revolve through an angle of ninety degrees on the power stroke in a clockwise direction. The return swing of the piston in an anti-clockwise direction will act as an exhaust stroke, so that the exhaust port being opened, the burned gases will be expelled and the cycle of operations are then repeated. It will thus be obvious that when compartment A is going through the cycle of suction, compression, explosion and exhaust, B is going through the cycle of compression, explosion, exhaust and suction, C, explosion, exhaust, suction and compression, and D, exhaust, suction, compression and explosion, the firing order in this case being C, B, A and D.

Figure 10:
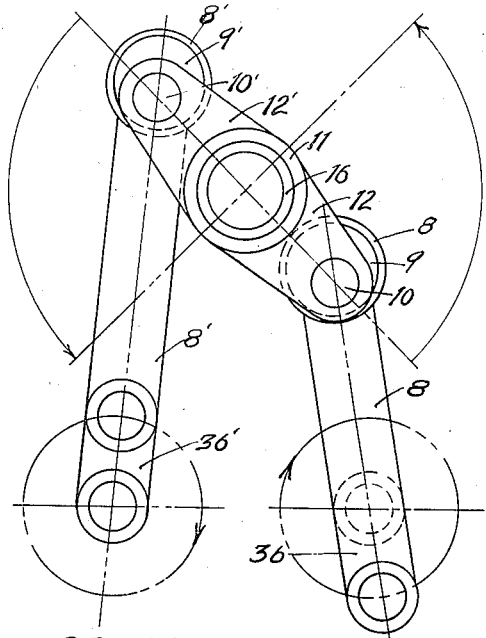
Figures 10, 11 and 12 are views illustrating the movement of the rocker arm, eccentric and connecting arms as viewed from the rear of the engine.
Figure 11:
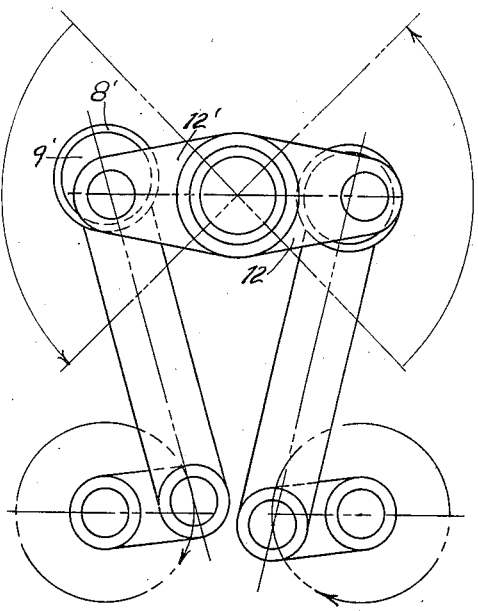
Figure 12:
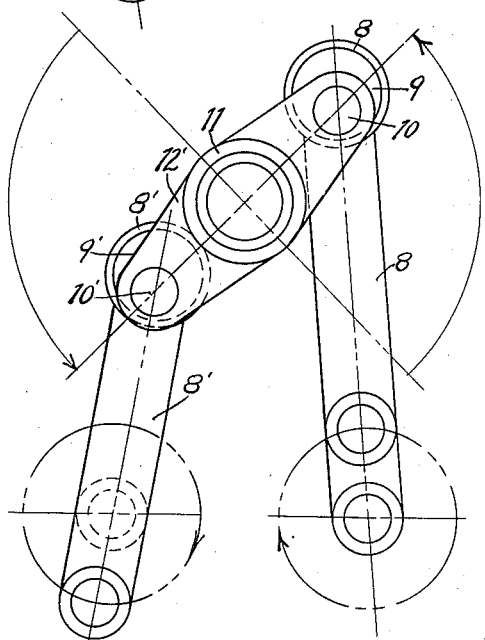

Due to the obliquity of the connecting rods 8—8', they will not move through equal circular arcs at the same time at their lower ends, and as shown in Figures 10, 11 and 12, which show the rocker arms at the beginning, middle and end of a stroke, the difference in travel of the two connecting rods and their respective gears may be compensated for by the insertion of eccentric discs 9—9', which are free to revolve in the upper circular extension of cranks 8—8', and they are inserted between forked arms 12—12'. Pins 10—10' are passed through the outer ends of the arms 12—12' and eccentric disc 9—9'. The power is thus transmitted by one of the arms 12—12', as the case may be, on its downward swing. As shown in Figures 10, 11 and 12, arm 12' is swinging downward on the power stroke and arm 12 upward on the idle stroke as viewed from the rear end of the engine. On the down stroke of arm 12', center of pin 10', eccentric disc 9', and circular crank extension 8', are all in line, thus causing them to act as a rigid member. On the upward stroke of arm 12, the difference in travel of crank 8 is compensated for by the shifting of eccentric disc 9, as shown. This action alternates between each arm 12—12' and their connecting media on each piston swing.

The external moving parts may be lubricated by means of oil or grease cups properly placed. Lubrication of the internal sliding parts may be accomplished in various ways, as for example, by the introduction of a suitable lubricant or oil into the interior of the hollow piston, and which will be thrown outward by centrifugal force, passing out of the piston lugs or extensions 15—15' through holes 24 which open between the piston rings or strips 13, thus distributing the lubricant over the inner surface of the drum 1 where they come into sliding or frictional contact with the piston. Obviously an engine may be constructed with a casing having several drums or compartments and an oscillating member in each compartment, the various sliding members or pistons being all connected.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a cylindrical drum provided with end enclosures integral therewith, a hollow cylindrical shaped oscillating member arranged in said drum and having its axis of oscillation coinciding with the axis of the drum, said drum provided with a partition integral therewith at each side of said oscillating member and extending radially inwardly to and contacting therewith to divide the drum into two semi-cylindrical chambers, said oscillating member provided with a radially outwardly extending wing in each chamber to contact with the inner peripheral wall of the drum and divide each chamber into two compartments, one on each side of each wing and provided with oil ducts through said wings, said drum provided with an inlet port and an exhaust port for each of its pair of compartments, a valve for each of said ports, means for actuating said valves in a predetermined manner, a drive shaft, and means for operatively connecting said oscillating member and said shaft, whereby the shaft is rotated continuously in one direction upon the oscillation of said member.

2. In an internal combustion engine of the kind described and in combination, a cylindrical drum comprising a plurality of like parts and means for securing said parts together, the end enclosures of said drum being integral therewith, an oscillating member arranged in said drum to have its axis of oscillation coinciding with the drum axis, said drum provided with partitions integral therewith extending radially to slidably engage with the oscillating member and divide the same into a plurality of chambers, said oscillating member provided with wing parts arranged one in each of said chambers to divide each chamber into a plurality of combustion compartments, said drum provided with an inlet port and an exhaust port for each compartment, means for controlling said ports, a drive shaft, and means for operatively eccentrically connecting said shaft with the oscillating member, whereby the oscillations thereof will rotate said shaft continuously in one direction.

3. In a device of the kind described and in combination, a cylindrical drum provided with end inclosures, a cylindrical shaped oscillating member arranged in said drum with its axis of oscillation coinciding with the axis of the drum, said drum provided with a partition at each side of said member extending to and contacting with the member and dividing the drum into two chambers, said oscillating piston member provided with an extended part in each chamber, and of a length to contact with the inner walls of the drum, and dividing each chamber into two compartments, said drum provided with an inlet port and an exhaust port for each compartment, a valve for each of said ports, means for actuating said valves in a predetermined manner, ignition mechanism for each compartment, a drive shaft and means for operatively connecting said oscillating member and said shaft whereby the shaft is rotated upon the oscillation of said member, comprising a pair of arms operatively connected with said member, links eccentrically connected with said arms, crank arms connecting said links, gears connected with said crank arms and a main gear mounted on said shaft and arranged to mesh with first mentioned gears.

In testimony whereof, I have hereunto signed my name in the presence of two subscribing witnesses.

EDWARD L. GROSS.

Witnesses:
 Roy W. Hill,
 Charles I. Cobb.